United States Patent [19]

Imhoff et al.

[11] Patent Number: 5,357,360

[45] Date of Patent: Oct. 18, 1994

[54] OPTICAL DATA NETWORK HAVING ADJUSTABLE DELAYS FOR SWITCHING OVER TO BACKUP UNIT

[75] Inventors: Andreas Imhoff; Hendrik Keller; Udo Reimann; Walter Wessely, all of München, Fed. Rep. of Germany

[73] Assignee: Siemens Aktiengesellschaft, Munich, Fed. Rep. of Germany

[21] Appl. No.: 966,062

[22] PCT Filed: Jun. 24, 1991

[86] PCT No.: PCT/DE91/00514

§ 371 Date: Jan. 11, 1993

§ 102(e) Date: Jan. 11, 1993

[87] PCT Pub. No.: WO92/01341

PCT Pub. Date: Jan. 23, 1992

[30] Foreign Application Priority Data

Jul. 11, 1990 [DE] Fed. Rep. of Germany ....... 4022027

[51] Int. Cl.5 .......................... H04J 14/02; H04J 14/08
[52] U.S. Cl. ...................................... 359/125; 359/110;
359/115; 359/123; 359/135; 359/137; 359/140

[58] Field of Search ............... 359/114, 115, 118, 123,
359/124, 125, 135, 137, 140, 110; 370/16, 16.1

[56] References Cited

FOREIGN PATENT DOCUMENTS 8111353  1/1985  Japan ................... H04B 9/00
3296334 12/1991  Japan ................... 359/110

Primary Examiner—Richard E. Chilcot, Jr.
Assistant Examiner—Rafael Bacares
Attorney, Agent, or Firm—Hill, Steadman & Simpson

[57] ABSTRACT

An optical data network, in which data is exchanged between an active central unit (CU1) and subscriber line units (DU1, DU2, DU3, . . .) using the time-division multiplexing method. The reliability is considerably enhanced by parallel connection of a back-up central unit (CU2). In order to permit a disruption-free switchover between the central units (CU1, CU2), the latter have controllable delay devices (TDL1, RDL1, TDL2, RDL2), so that the delays of the signals to and from the subscriber line units (DU1, DU2, DU3, . . . . ) can be matched with the aid of a special line unit (SDU).

9 Claims, 3 Drawing Sheets

OPTICAL DATA NETWORK HAVING ADJUSTABLE DELAYS FOR SWITCHING OVER TO BACKUP UNIT

BACKGROUND OF THE INVENTION

The invention relates to a highly reliable optical data network.

In future data networks, such as the digital telephone network for example, optical waveguides with the corresponding transmission equipment will be employed instead of the metal lines used hitherto. An optical data network of this type is described in British Telecom Technology Journal, Vol. 7, No. 2, April 1989, pp. 100-113. The data is transmitted in a passive optical network (fiber to the home/curb) which physically corresponds to a tree network and is logically described by a star network. For converting the electrical signals into optical values, in addition to the electrooptical transducers, control devices are required for performing the transmission line procedures and formatting the data. These are essentially accommodated in a central unit or headend which is installed on the switching side and also handles the error monitoring. The branching in the tree network is handled by optical splitters. Data is always transmitted between the subscriber line units and a central unit, via a switching device, and also between a central unit and the subscriber line units. A time-division multiplexing method (TDM) is employed in the direction toward the subscriber and an adaptive time-division multiplexing method (TDMA—time division multiple access) is employed in the direction toward the central unit. The transmission frames have the same basic structure in both directions. In addition, the data rate for each subscriber is the same in both directions. In order for it to be possible to transmit the data packets from the subscriber line units to the central unit, first of all the different delays resulting from the different lengths of the optical waveguides between the central unit and the subscriber line units must be equalized.

This is performed by electronic delay devices in the subscriber line units, by means of which the total of the delays in the optical waveguides and the transmission equipment are set to the same value for all subscriber line units. The calibration and setting of the electronic delay devices is performed by the control device of the central unit (operation and maintenance—O&M) in cooperation with the individual subscriber line units. The control device performs tasks such as the calibration and checking independently. Other tasks, such as a two-sided configuration of data channels with different transfer rates between the central unit and the subscribers, on the other hand, are only performed when requested by the exchange. Besides the data channels, for this purpose there are additional control and monitoring channels, termed O&M channels herein, between the central unit and the subscriber line units. The central unit always handles the control and monitoring.

The central unit is thus an indispensable component of the overall transmission equipment. Its failure would interrupt the connection to a comparatively large group of subscribers.

SUMMARY OF THE INVENTION

The object of the invention is to disclose a data transmission network with high reliability. In addition, it is to be possible to exchange the central unit without disruption.

This object is achieved by the optical data network having a central unit connected between a switching device and an optical subscriber line network and a plurality of subscriber line units connected via optical waveguides and couplers which transmit or exchange data in each case via the central unit using the time-division multiplexing method. At least one further back-up central unit is functionally connected in parallel with the active central unit. Both central units are connected to the subscriber line network via optical waveguides. Each of the central units has a controllable transmission delay device in the transmission path and a controllable reception delay device in the reception path. The reception delay device of the back-up central unit is set up by received signals. At least one special line unit connected to the subscriber line network is provided, which special line unit has a controllable delay device in the transmission path. The special line unit has in the reception path a measuring device for determining the delay difference between send signals of the active central unit and of the back-up central unit. The special line unit transmits a correction signal, by means of which the transmission delay device of the back-up central unit is controlled until the delays for the send signals of both central units are the same.

The reliability of the data communications system is considerably enhanced by a second or several back-up central units. It is likewise also possible to provide two or more special line units. In order to enable a disruption-free switchover to a back-up central unit in the event of the failure of, or fault in, the active central unit, or for test purposes, the back-up central unit must not only assume exactly the same functions of the previous active central unit, in addition exactly the same delays to and from the subscriber line units must also exist. This is achieved by means of adjustable electronic delay devices of the central units.

It is also advantageous if the setting of the reception delay device of the back-up central unit is carried out by a special procedure via the special line unit. The advantage of this is that an unambiguous setting is achieved, whereas otherwise an incorrect setting to the response signals of the subscriber line units already transmitted during the calibration can occur. In addition, the subsequent calibration of new subscriber line units also no longer constitutes a disruption.

It is advantageous that the special line unit has, apart from the customary clock generator controlled by the received data with a large time constant, a further controllable oscillator with a small time constant, so that it is possible to measure the phase difference between the data received by the active central unit and the back-up central unit. In addition, a time measuring device is provided in the special line unit which makes it possible to measure even delay differences of more than one bit. It is however also possible to measure the total delay difference simultaneously.

The special line unit notifies the back-up central unit of the phase and delay differences in coded form, and the back-up central unit corrects its transmission delay accordingly.

It is advantageous if the request for transmitting a test signal sequence by the back-up central unit is triggered by a command of the active central unit, which triggers in the special line unit a corresponding (identical) request signal causing the back-up central unit to transmit the synchronization signal. A direct connection between the central units is consequently not required.

It is expedient for the utilization of transmission capacity if in addition a special line unit also performs the tasks of a conventional subscriber line unit, if therefore it is likewise possible to connect one or more subscribers thereto.

For a further switchover to a further back-up central unit or a standby central unit, it is advantageous if the back-up central unit sets its delays to a mean value after assuming the function of an active central unit. As a result, a further back-up central unit or a standby central unit can also adjust its delay again in the event of the signal path being altered without the dimensions of the delay devices being unnecessarily large.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
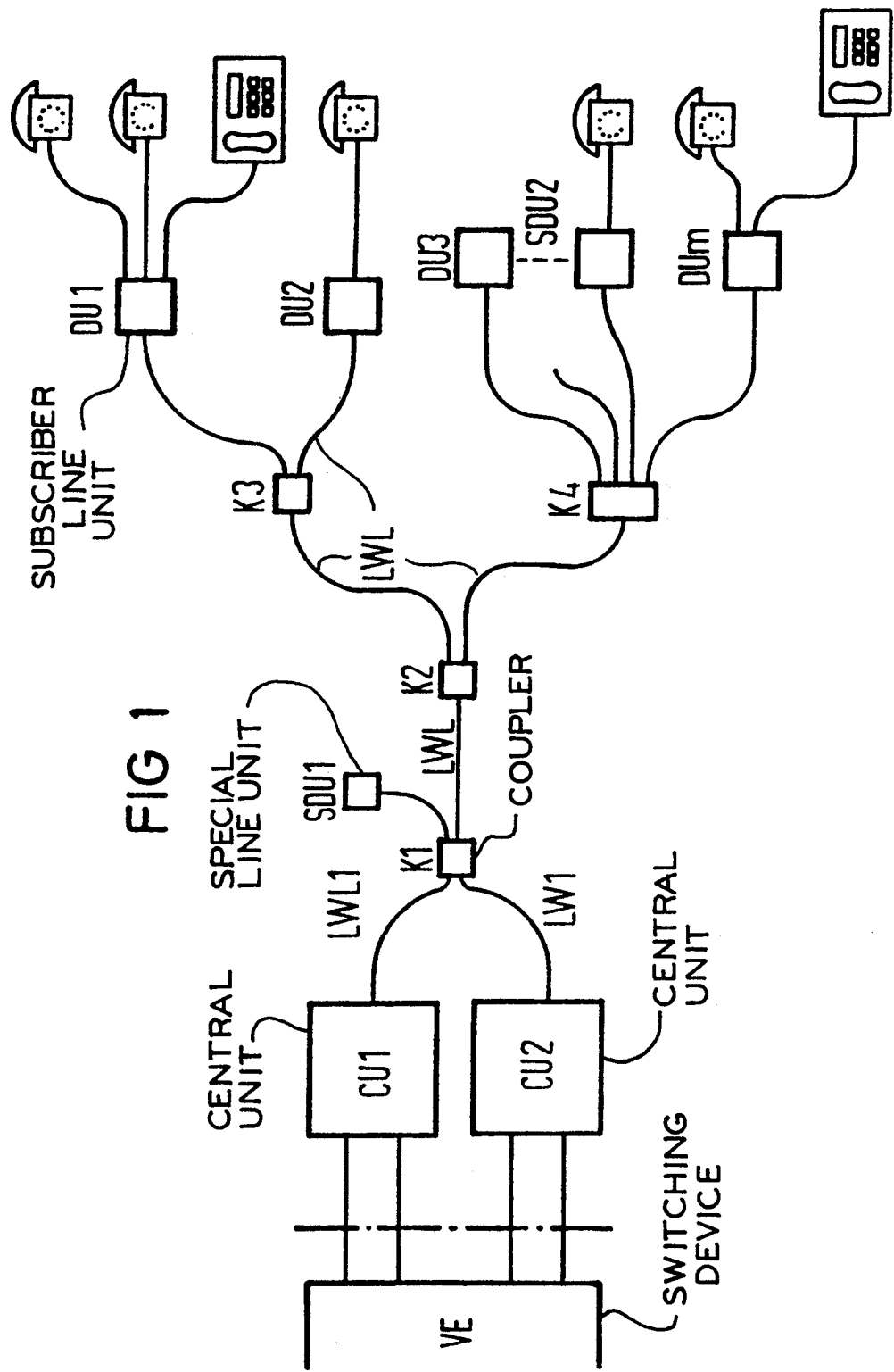
FIG. 1 shows the structure of a data transmission network according to the invention.

FIG. 1 shows a basic representation of a part of the optical data network. A tree network is connected via two central units CU1 and CU2 to a switching device VE as a subscriber line network—represented in simplified form by optical waveguides LWL with couplers K. The subscriber lines of the central unit on the subscriber side, the optical waveguides LWL1 and LWL2, are combined by a first coupler K1. The combining or splitting of two or even more optical waveguides is possible in each coupler. Thus, a second coupler K2 is connected to one terminal of the first coupler K1 via an optical waveguide LWL, from which second coupler optical waveguides branch to a plurality of subscriber line units DU1, DU2, . . . (distant units) via further couplers K3, K4. A plurality of terminal devices, for example telephone sets or data communications equipment, can be connected to each subscriber line unit. It is already possible to connect a special line unit SDU1 to a further terminal of the first coupler K1. For reasons of reliability, it is also possible to provide a further special line unit SDU2, which can likewise be connected to any point of the optical network. As a rule, a plurality of optical tree networks are connected to the switching device VE via a corresponding number of central units.

Figure 3:
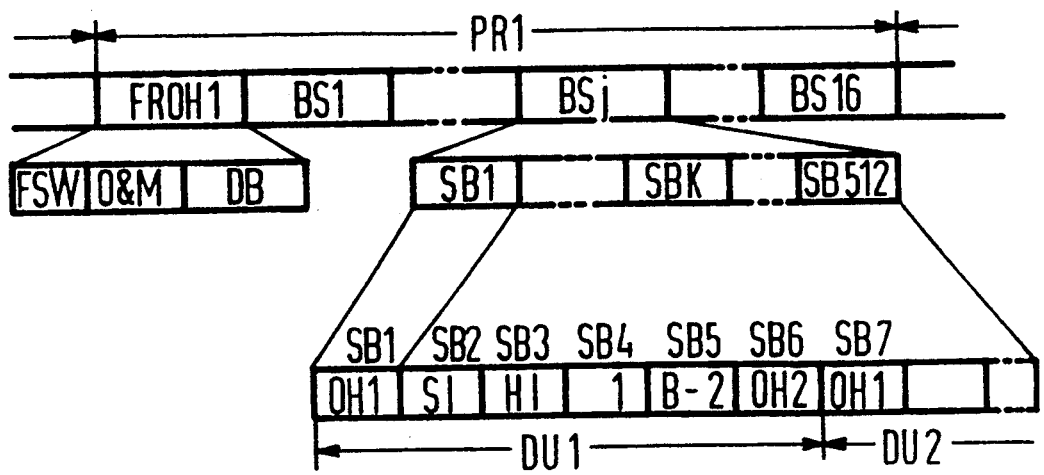
FIG. 3 shows a pulse frame.
Figure 4:
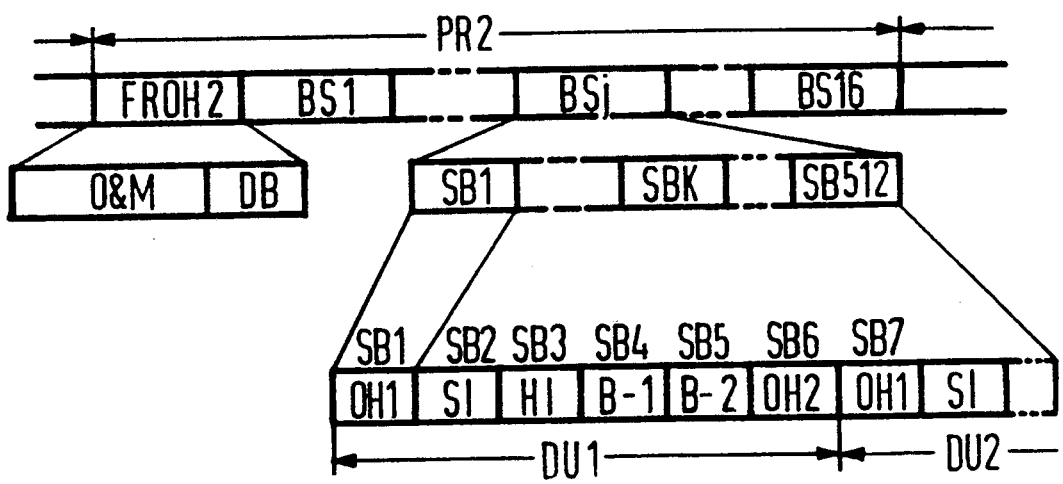
FIG. 4 shows a pulse frame for the opposite direction.

The transmission is carried out here in both transmission directions on the optical waveguides in wavelength-division multiplexing mode. Separate optical waveguides are of course also possible for the two transmission directions. As already described, the transmission between central unit and the subscriber line circuits, and likewise in the opposite direction, is carried out in time-division multiplexing mode. Pulse frames PR1 and PR2 suitable for this purpose are illustrated in FIGS. 3 and 4, and will be discussed in more detail later.

Figure 2:
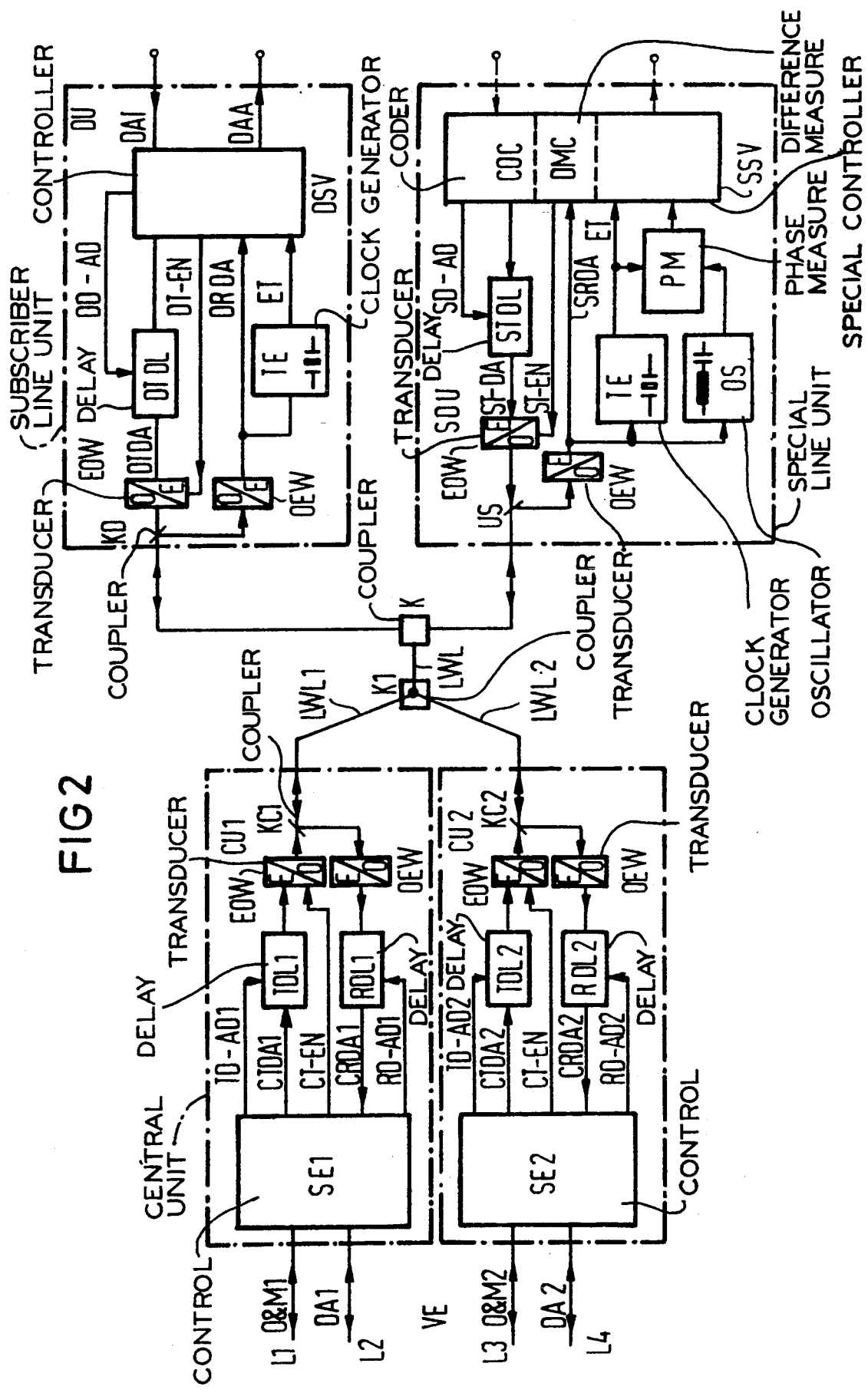
FIG. 2 shows block circuit diagrams of the central units, a subscriber line unit and a special line unit.

FIG. 2 shows the central units CU1, CU2 and in each case one subscriber line unit DU and one special line unit SDU in a minimum network. Here the special line unit SDU and the subscriber line unit DU are connected via a common coupler K to the subscriber line network and to the optical waveguide LWL.

The first central unit CU1 contains a control unit SE1, which is connected to the switching device VE via lines L1 and L2 via which serial and/or parallel user data DA1 and O&M data O&M1 are exchanged. Insofar as this is possible given the high data rate, the control unit is realized by microprocessors. Since the data transmission method is known in principle, the person skilled in the art will have no difficulty at all in realizing an appropriate controller. New in the central unit, however, are two delay devices TDL1 and RDL1, the delay time of which is set by the control unit by means of control signals TD-AD1 and RD-AD1 respectively. The delay devices are connected to the optical waveguide LWL1 via an electrooptical transducer EOW and an optoelectronic transducer OEW via an internal wavelength coupler (wavelength-division multiplexing—WDM) KC1. The send data CTDA1 are transmitted by the control unit via the transmission delay device TDL1, and the receive data CRDA1 are supplied to the control unit SE1 via the reception delay device RDL1. The electrooptical transducer EOW can be switched off by a send-activation signal CT-EN.

The second control unit CU2 is of identical construction and is connected via further lines L3 and L4 to the switching device VE. The mutually corresponding modules and signals are, where necessary, indicated by the suffix 2.

As master, the active central unit CU1 organizes the execution of multiplexing between itself and the line units DU and SDU. It also ensures a corresponding conversion of the data formats and handles the data traffic with the switching device VE both for user data and for O&M data.

In the subscriber line unit DU illustrated, an associated wavelength coupler KD handles the feeding in or the splitting of the signals in the transmit and receive direction. An optoelectronic transducer OEW converts the received optical signals into electrical data signals DRDA, which are supplied to a clock generator TE and a controller DSV. The latter in turn contains all the circuits required for performing the TDM/TDMA operation, and converter devices which convert the received data into continuous data streams, and likewise convert the continuous data of the terminal device into data packets and insert them into the pulse frames.

The send data DTDA are transmitted by the controller DSV via a transmission delay device DTDL, an electrooptical transducer EOW and the wavelength coupler KD. The transmission delay device DTDL is controlled by control signals DD-AD of the central unit.

The primary task of the subscriber line unit is to convert the data DRDA received in the form of packets into suitable output data DAA, and likewise to convert the input data DAI into data packets and transmit them to the central unit. Both parallel and serial data of the terminal devices can be processed. Like the control unit SE of a central unit, the controller DSV must therefore have the appropriate buffers and converters available to it. For the sake of better clarity, the representation of coders and decoders (for example CMI) for the transmission of the optical signals has been omitted in all cases. The clock generator TE receives a continuous receive clock signal ET from the received data DRDA.

Like the subscriber line unit, in addition to a wavelength coupler KS, an optoelectronic transducer OEW and an electrooptical transducer EOW, the special line unit SDU contains a special controller SSV. The received data SRDA are supplied to said special controller SSV, which in turn outputs send data STDA via a delay device STDL. Apart from the clock generator TE which—like the clock generator of a subscriber line unit—has a very large time constant, a measuring device is also provided with which it is possible to determine the delay difference of the send signals CTDA1 and CTDA2 of the two central units CU1 and CU2. In this exemplary embodiment, a controllable oscillator OS, realized by an LC resonant circuit for example, with a small time constant is provided for this purpose, the output of which oscillator, like the output of the clock generator too, is supplied to a phase measuring device PM. Moreover, a difference measuring device DMC contained in the special controller SSV is also provided.

Furthermore, the special line unit can detect special request signals and likewise transmit request and correction signals.

The special unit can be designed in such a way that it can also perform all the functions of the subscriber line unit.

Both central units CU1 and CU2 receive the same data, synchronization signals and clock signals from the exchange. In general different lines L1 to L4 are provided for the different data and directions. However, only the data DA1 and O&M1 are supplied to the switching device by the active central unit. Controlled by the switching device VE and the control unit SE1 of the active central unit CU1, first of all the subscriber line units DU and the special line unit SDU, or line units SDU1 and SDU2 respectively, are calibrated, that is to say their delay devices DTDL and STDL respectively are set in such a way that the total delay between transmission of a corresponding signal, for example a frame start word, from the central unit and the reception of the response signal of a line unit is a constant time duration (for example 100 μs). The delay devices TDL1 and RDL1 of the active central unit CU1 are at a mean value here. The commands necessary for calibration for setting the transmission delay devices DTDL and STDL of the subscriber and the special line units and their response signals are transmitted during the frame overheads FROH1 and FROH2 of the pulse frames respectively.

Both analog and digital delay lines can be employed as delay devices. Delays extending beyond one bit duration on the transmission path can also be realized by the control unit or by shift registers.

After the "calibration", specific time slots of the pulse frames PR1, PR2 are assigned to the subscriber line units and the special line unit, via which switching-specific information is also transmitted in addition to the user data. The line units are of course controlled in such a way that their send signals do not overlap one another.

Before discussing the function of the special line unit and further details, first the pulse frames used in the exemplary embodiment will be explained in more detail.

FIG. 3 shows the pulse frame PR1 for the transmission direction from a central unit to the subscriber line units. A frame start word FSW and O&M information (divided into 64 O&M channels for example) are transmitted in the frame overhead FROH1. The frame overhead is padded with dummy bits DB to the extent of one of the following basic blocks. 16 basic blocks BB1 to BB16 each with 4096 bits are then transmitted, each of which is divided in the same way into subblocks SB1 to SB512. Each subblock has 8 bits, so that it realizes a B-channel with a transfer rate of 8 bits$\times 16\times 500$ 1/s $=64$ kbits/s given a frame repetition rate of 500 Hz.

In the example illustrated in FIG. 3, two of said B-channels (this corresponds to the user information of an ISDN basic access) are transmitted to the first subscriber line unit DU1. A total of 6 subblocks SB1 to SB6 are used for this. SI and HI contain switching information. OH1 and OH2 can be used for transmitting information for organizational purposes, and B-1 and B-2 contain the user information. Further details will not be discussed here, since they do not constitute part of the invention.

The pulse frame PR2 according to FIG. 4 for the opposite direction has basically the same structure. The frame overhead FROH2 again serves to transmit the O&M channels. Dummy bits DB are again added. Again 16 basic blocks BB1 to BB16 subsequently follow. In the opposite direction the same transmission capacity—two 64 kbit/s channels for the first subscriber line unit DU1—is in turn available.

In order to ensure a disruption-free switchover between the central units in the event of a fault or testing, first of all the delay differences, caused by different lengths of the optical waveguides LWL1 and LWL2 as well as component tolerances, from the line units DU, SDU to the two central units CU1, CU2 must now be equalized.

Owing to the transmission principle, data to be transmitted and received data are processed with the same clock signal in the central units. Likewise, the pulse frames in the two transmission directions are phase-locked with respect to one another.

Since it receives the same clock signals and signals as the active central unit, the back-up central unit CU2 could align its delay already by adjusting its reception delay RDL2 and thus equalize the component tolerances and delay tolerances between the optical waveguide LW1 and LW2. However, this has some disadvantages as already described above.

It is, however, also possible to use another method of matching the delay differences from the line units to the central units CU1 and CU2. The special line unit SDU is used for this purpose, and is initially calibrated like the subscriber line unit. By means of a command in an O&M channel, the active central unit CU1 causes the special line unit to transmit a defined bit sequence, called the synchronization sequence. The back-up central unit searches the incoming data stream during a receive window or constantly, detects the synchronization sequence and compares the time of its arrival with the expected time. It adjusts its reception delay device until the difference is zero.

The setting value for the reception delay unit is also used as the estimated value for the transmission delay device TDL2. As a result of the component tolerances and the different signal delays in the two directions, however, a more exact matching of the delays from the central units to the special line unit and hence to all other subscriber line units must be carried out. A test signal sequence is transmitted by the back-up central unit for this purpose.

The delay of the transmission delay device STDL in the special line unit was already set exactly by the active central unit CU1 during the calibration. The clock generator TE of the special line unit is also controlled or regulated by the send data CTDA1 thereof. The clock generator TE has—as already mentioned—a high time constant and can be realized, for example, by a phase-locked loop with quartz oscillator. The necessary steps for transmitting a test signal sequence of the back-up central unit can be initiated by the active central unit CU1. A request signal is sent to the special line unit SDU via an O&M channel. Said unit evaluates the contents and immediately transmits them as an echo again via an O&M backward channel, the information of which is also received by the back-up central unit CU2. The active central unit CU1 briefly blocks its own transmission, for example at the beginning of a fixed O&M time slot or of the frame overhead FROH, by switching off its own laser and thus after a brief pause allows the back-up central unit CU2 to transmit a number of synchronization bits and then its own test signal sequence, which is evaluated by the special line unit. The delay difference between the data, for example, of the frame start word, the active central unit CU1 and the test signal sequence is determined in a measuring device. Here with the aid of the controllable oscillator OS which, as mentioned, has a short time constant. A phase measuring device PM determines the phase difference between the received data of the active central unit CU1 and the test signal sequence of the back-up central unit CU2. Furthermore, the difference measuring circuit DMC evaluates the received test signal sequence and can thus determine even delay differences of more than one bit.

A direct measurement of the total delay difference is likewise possible with the corresponding circuitry outlay.

The delay difference or a signal extracted therefrom is converted by the coder circuit COC and transmitted as a correction signal via the associated O&M backward channel to the back-up central unit CU2, which thereupon adjusts its transmission delay device TDL2 until the signal delays from both central units CU1 and CU2 to the special line unit SDU are exactly the same, that is to say a phase difference also no longer occurs between the receive signals in the special line unit.

The adjustment of the transmission delay device—as also that of the reception delay device—can be carried out in small steps. After every transmission of the synchronization sequence by the back-up central unit CU2, the latter switches its laser off again and the active central unit CU1 continues to transmit. As a result of the high time constant of the clock generators in the further subscriber line units, their clock remains virtually unchanged, so that the following data bits can be received without disruption.

Depending on the structure of the pulse frame, the request signals, the synchronization sequences and the test signal sequences are transmitted during the frame overhead instead of the O&M information or instead of the dummy bits. A plurality, or all, of the O&M channels can also be provided for transmitting the synchronization sequence, in which case the further line units are of course then blocked on the transmitting side.

Once the delays of the two central units to the line units and in the reverse direction are exactly the same, it is possible to switch over to the back-up central unit CU2 without disruptions. At the same time the signals DA2, O&M2 must also be switched through to the exchange from the second control unit SE2 instead of the signals DA1, O&M1 from the control unit SE1. This can be accomplished in a controlled manner by a synchronized switchover from the exchange or a monitoring device, and can even be manually triggered for test purposes. The switchover is expediently performed at the beginning of a pulse frame or after the O&M part if no relevant data are being transmitted between the active central unit and the line units.

The back-up central unit CU2 then functions as the active central unit. The delay times of the transmission and reception delay devices can be gradually set to the mean value, so that after the defective central unit has been replaced by a new one, the latter can adjust its delay again.

This option is only necessary if the delays on the optical waveguides vary greatly as a result of new routing.

It is of course also possible to provide two or more special line units to improve reliability. Only one of these is activated as the special line unit by a command in each case, while the second one or further ones serve as subscriber line units.

The invention is not limited to the particular details of the apparatus depicted and other modifications and applications are contemplated. Certain other changes maybe made in the above described apparatus without departing from the true spirit and scope of the invention herein involved. It is intended, therefore, that the subject matter in the above depiction shall be interpreted as illustrative and not in a limiting sense.

What is claimed is:

1. An optical data network having an active central unit connected between a switching device and an optical subscriber line network and a plurality of subscriber line units connected by optical waveguides and couplers, each of which transmit or exchange data via the active central unit using a time-division multiplexing method, comprising: at least one further back-up central unit connected functionally in parallel with the active central unit, the central units being connected to the subscriber line network by optical waveguides; each of the central units having a controllable transmission delay device in a transmission path thereof and a controllable reception delay device in a reception path thereof, the reception delay device of the back-up central unit being set by received signals; at least one special line unit connected to the subscriber line network, which special line unit has a controllable delay device in a transmission path thereof; the special line unit having in a reception path thereof a measuring device for determining the delay difference between send signals of the active central unit and of the back-up central unit; and the special line unit transmitting a correction signal, by means of which the transmission delay device of the back-up central unit is controlled until delays for the send signals of both central units are the same.

2. The optical data network as claimed in claim 1, wherein the special line unit transmits a synchronization sequence with which the reception delay device of the back-up central unit is set.

3. The optical data network as claimed in claim 1, wherein a delay time of the reception delay device of the back-up control unit is also initially set in the transmission delay device of the back-up central unit.

4. The optical data network as claimed in claim 1, wherein the back-up central unit transmits a test signal sequence, a delay difference of which to data transmitted by the active central unit is evaluated by the special line unit and is sent as a correction signal to set the transmission delay device of the back-up central unit.

5. The optical data network as claimed in claim 4, wherein a request signal is sent to the special line unit by the active central unit, and wherein the special line unit thereupon transmits a further request signal for transmission of a test signal sequence by the back-up central unit.

6. The optical data network as claimed in claim 1, wherein the special line unit has a clock generator, controlled by a receive signal, with a high time constant and a controlled oscillator with a low time constant, and wherein a phase measuring device is connected to outputs of the clock generator and of the oscillator.

7. The optical data network as claimed in claim 1, wherein all functions of a subscriber line unit of the plurality of subscriber line units are also realized in the special line unit.

8. The optical data network as claimed in claim 1, wherein after the back-up central unit assumes the function of active central unit, delays of the transmission delay device of the back-up channel unit and of the reception delay device of the back-up channel unit are set to a mean value.

9. The optical data network as claimed in claim 1, wherein send and receive signals are transmitted using a wavelength-division multiplexing method, and wherein the central units, the subscriber line units and the special line unit are connected to the subscriber line network by respective electrooptical transducers and optoelectronic transducers and wavelength couplers.

* * * * *